(12) United States Patent
Huh et al.

(10) Patent No.: US 9,790,403 B2
(45) Date of Patent: Oct. 17, 2017

(54) RADICAL CURABLE ADHESIVE COMPOSITION, AND POLARIZING PLATE AND OPTICAL MEMBER COMPRISING SAME

(71) Applicant: LG CHEM, LTD., Seoul (KR)

(72) Inventors: Eun-Soo Huh, Daejeon (KR); Kwang-Seung Park, Daejeon (KR); Mi-Rin Lee, Daejeon (KR); Jun-Wuk Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/902,535

(22) PCT Filed: Sep. 29, 2014

(86) PCT No.: PCT/KR2014/009136
§ 371 (c)(1),
(2) Date: Dec. 31, 2015

(87) PCT Pub. No.: WO2015/047004
PCT Pub. Date: Apr. 2, 2015

(65) Prior Publication Data
US 2016/0376469 A1    Dec. 29, 2016

(30) Foreign Application Priority Data

Sep. 30, 2013  (KR) .................. 10-2013-0117042
Sep. 26, 2014  (KR) .................. 10-2014-0129392

(51) Int. Cl.
| | | |
|---|---|---|
| C09J 4/00 | (2006.01) | |
| C08F 220/28 | (2006.01) | |
| C09J 133/14 | (2006.01) | |
| C09J 133/24 | (2006.01) | |
| G02F 1/1335 | (2006.01) | |
| G02B 5/30 | (2006.01) | |
| G02B 1/14 | (2015.01) | |

(52) U.S. Cl.
CPC .............. *C09J 4/00* (2013.01); *C08F 220/28* (2013.01); *C09J 133/14* (2013.01); *C09J 133/24* (2013.01); *G02B 1/14* (2015.01); *G02B 5/305* (2013.01); *G02B 5/3033* (2013.01); *G02F 1/133528* (2013.01); *C08F 2220/281* (2013.01)

(58) Field of Classification Search
None
See application file for complete search history.

(56) References Cited

U.S. PATENT DOCUMENTS

| | | | |
|---|---|---|---|
| 4,581,180 A * | 4/1986 | Yokoshima | C07F 9/091 526/278 |
| 2004/0151869 A1 | 8/2004 | Tokuda et al. | |
| 2006/0135719 A1 | 6/2006 | Moszner et al. | |
| 2010/0253886 A1 | 10/2010 | Kim et al. | |
| 2011/0083804 A1 | 4/2011 | Curet | |
| 2014/0072731 A1 | 3/2014 | Seo et al. | |
| 2015/0099127 A1 | 4/2015 | Ogawa et al. | |

FOREIGN PATENT DOCUMENTS

| | | |
|---|---|---|
| CN | 1531726 A | 9/2004 |
| JP | 03-279307 A | 12/1991 |
| JP | 04-154708 A | 5/1992 |
| JP | 09-132761 A | 5/1997 |
| JP | 11-100419 A | 4/1999 |
| JP | 2006-176522 A | 7/2006 |
| JP | 2007-023147 A | 2/2007 |
| JP | 2008-009329 A | 1/2008 |
| JP | 2009-155470 A | 7/2009 |
| JP | 2009-298991 A | 12/2009 |
| JP | 4459880 B2 | 4/2010 |
| JP | 2011-76058 A | 4/2011 |
| JP | 2011-076067 A | 4/2011 |
| KR | 2002-0056447 A | 7/2002 |
| KR | 10-2009-0071716 A | 7/2009 |
| KR | 10-2013-0040725 A | 4/2013 |
| KR | 1020130103290 A | 9/2013 |

OTHER PUBLICATIONS

Liang, et al.: "Photopolymerization and Thermal Behavior of Phosphate Diacrylate and Triacrylate Used as Reactive-Type Flame-Retardant Monomers in Ultraviolet-Curable Resins", Journal of Applied Polymer Science, vol. 97, 2005, pp. 185-194.

* cited by examiner

*Primary Examiner* — Sheeba Ahmed
(74) *Attorney, Agent, or Firm* — Dentons US LLP

(57) ABSTRACT

The present invention relates to a radical-curable adhesive composition including a (A) radical-polymerizable compound having at least one hydrophilic functional group in the molecule; a (B) phosphate-based compound having three (meth)acrylic groups in the molecule; and a (C) radical initiator, and a polarizing plate and an optical member including the radical-curable adhesive composition.

16 Claims, No Drawings

RADICAL CURABLE ADHESIVE COMPOSITION, AND POLARIZING PLATE AND OPTICAL MEMBER COMPRISING SAME

This application is a National Stage Entry of International Application No. PCT/KR2014/009136, filed Sep. 29, 2014, and claims the benefit of and priority to Korean Application Nos. 10-2013-0117042, filed Sep. 30, 2013 and 10-2014-0129392, filed Sep. 26, 2014, all of which are incorporated herein by reference in their entirety for all purposes as if fully set forth herein.

TECHNICAL FIELD

The present disclosure relates a radical-curable adhesive composition, and a polarizing plate and an optical member including the same, and in particular, to a radical-curable adhesive composition having excellent water resistance and heat resistance while having excellent adhesive strength between a polarizer and a protective film, and a polarizing plate and an optical member including the same.

BACKGROUND ART

Polarizing plates having a structure in which a protective film is laminated on one or both surfaces of a polarizer formed with a polyvinyl alcohol (hereinafter, referred to 'PVA')-based resin dyed with dichroic dye or iodine using an adhesive have been commonly used. Triacetyl cellulose (TAC)-based films have been normally used as a polarizing plate protective film in the art, however, such TAC films have a problem of being readily deformed in high temperature and high humidity environments. Accordingly, protective films made of various materials capable of replacing TAC films have been recently developed, and for example, a method of using polyethylene terephthalate (PET), a cycloolefin polymer (COP), and an acryl-based film either alone or as a mixture thereof has been proposed.

Herein, aqueous adhesives formed with an aqueous solution of a polyvinyl alcohol-based resin are normally used as an adhesive used to attach the polarizer and the protective film. However, aqueous adhesives have a problem in that the use is limited depending on the material of a film, since adhesive strength is weak when acryl-based films or COP films and the like are used as the protective film instead of TAC. In addition to the problem of adhesive strength defects depending on the materials, the aqueous adhesive also has problems in that curls are generated in a polarizing plate due to a drying process of the aqueous adhesive, and initial optical properties are degraded when materials of the protective film used on both surfaces of a PVA element are different. Moreover, a drying process is absolutely required when the aqueous adhesive is used, and differences in moisture permeability, heat expansion and the like occur in the drying process leading to a problem of a defect rate increase. As an alternative to solve the problems described above, methods of using non-aqueous adhesives instead of aqueous adhesives have been proposed.

Non-aqueous adhesives for a polarizing plate that have been proposed so far may be divided into radical-curable adhesives and cation-curable adhesives depending on the types of curing. Cation-curable adhesives have an advantage in that excellent adhesive strength is obtained for films made of various materials, but have many disadvantages in the manufacturing process due to a low curing speed and a low degree of curing. Radical-curable adhesives having acryl-based compounds or acrylamide-based compounds as a main component have been proposed in order to solve the problems of such cation-curable adhesives. However, although radical-curable adhesives having acryl-based or acrylamide-based compounds as a main component have a higher curing speed than cation-curable adhesives, they have problems in that water is used in large quantities due to weak water resistance, and as a result, appearances become poor such that discoloration occurs by the iodide ions in a polarizer being affected in a high humidity polarizing plate manufacturing process. In addition, radical-curable adhesives having acryl-based compounds or acrylamide-based compounds as a main component have a low glass transition temperature after radical curing, therefore, have a problem in that heat resistance reliability of a polarizing plate prepared using the adhesive is poor.

Accordingly, new radical-curable adhesives having excellent water resistance and heat resistance while having excellent adhesive strength between a polarizer and a protective film have been required.

Meanwhile, in another aspect, display devices having a structure in which a polarizing plate is attached to an upper and/or a lower substrate of a display panel that generates images using an adhesive have been generally used, and in order to obtain thin display devices, a method of laminating a protective film on only one surface of a polarizer using an adhesive, and directly attaching the surface of the polarizer opposite to the protective film-laminated surface to a display panel through an adhesive as a medium without a protective film has been proposed.

Herein, acryl-based adhesives are normally used as an adhesive used to attach a polarizing plate having the structure described above to a display panel. However, as for the acryl-based adhesive, at least a thickness of 20 μm is commonly required in order to maintain proper adhesive strength, and therefore, there is a problem in that the trend of display devices being thinner and lighter is not satisfied. In addition, in the case of acryl-based adhesives, an adhesive layer is generally formed using a method of applying an adhesive composition on a releasing film, drying the solvent, and then transferring the result on a sample surface, and this method has disadvantages in that the method is inconvenient when attaching a polarizing plate to a display device, and productivity decreases. Particularly, the acryl-based adhesive commonly has a glass transition temperature of 0° C. or less, and when this adhesive is directly attached to a polarizer and used, there is a problem in that heat resistance reliability is reduced, such that cracks occur in the polarizer in a thermal shock reliability test.

Accordingly, new attaching means capable of being formed to a thin film, improving productivity when attaching a polarizing plate and a display panel, and having superior heat resistance reliability has been required.

DISCLOSURE

Technical Problem

In view of the above, an object of the present invention is to provide a radical-curable adhesive composition having excellent water resistance and heat resistance while having excellent adhesive strength between a polarizer and a protective film, capable of being formed to a thin film, and capable of being used in attaching a polarizer and a display panel as well as in attaching a polarizer and a protective film, and a polarizing plate and an optical member including the radical-curable adhesive composition.

Technical Solution

In one aspect, the present invention provides a radical-curable adhesive composition including a (A) radical-polymerizable compound having at least one hydrophilic functional group in the molecule; a (B) phosphate-based compound having three (meth)acrylic groups in the molecule; and a (C) radical initiator.

Meanwhile, the radical-curable adhesive composition preferably includes the (A) radical-polymerizable compound in 40 to 93 parts by weight; the (B) phosphate-based compound in 1 to 30 parts by weight; and the (C) radical initiator in 0.5 to 20 parts by weight, with respect to 100 parts by weight of the radical-curable adhesive composition.

Meanwhile, the (A) radical-polymerizable compound is particularly preferably a mixture of a (a-1) radical-polymerizable first compound including at least one hydroxyl group and at least one (meth)acrylic group in the molecule; and a (a-2) radical-polymerizable second compound including at least two hydroxyl groups, at least one benzene ring or cyclohexane ring, and at least two (meth)acrylic groups in the molecule.

Herein, the (a-1) first compound may be one or more types selected from the group consisting of the following [Chemical Formula 1] to [Chemical Formula 21].

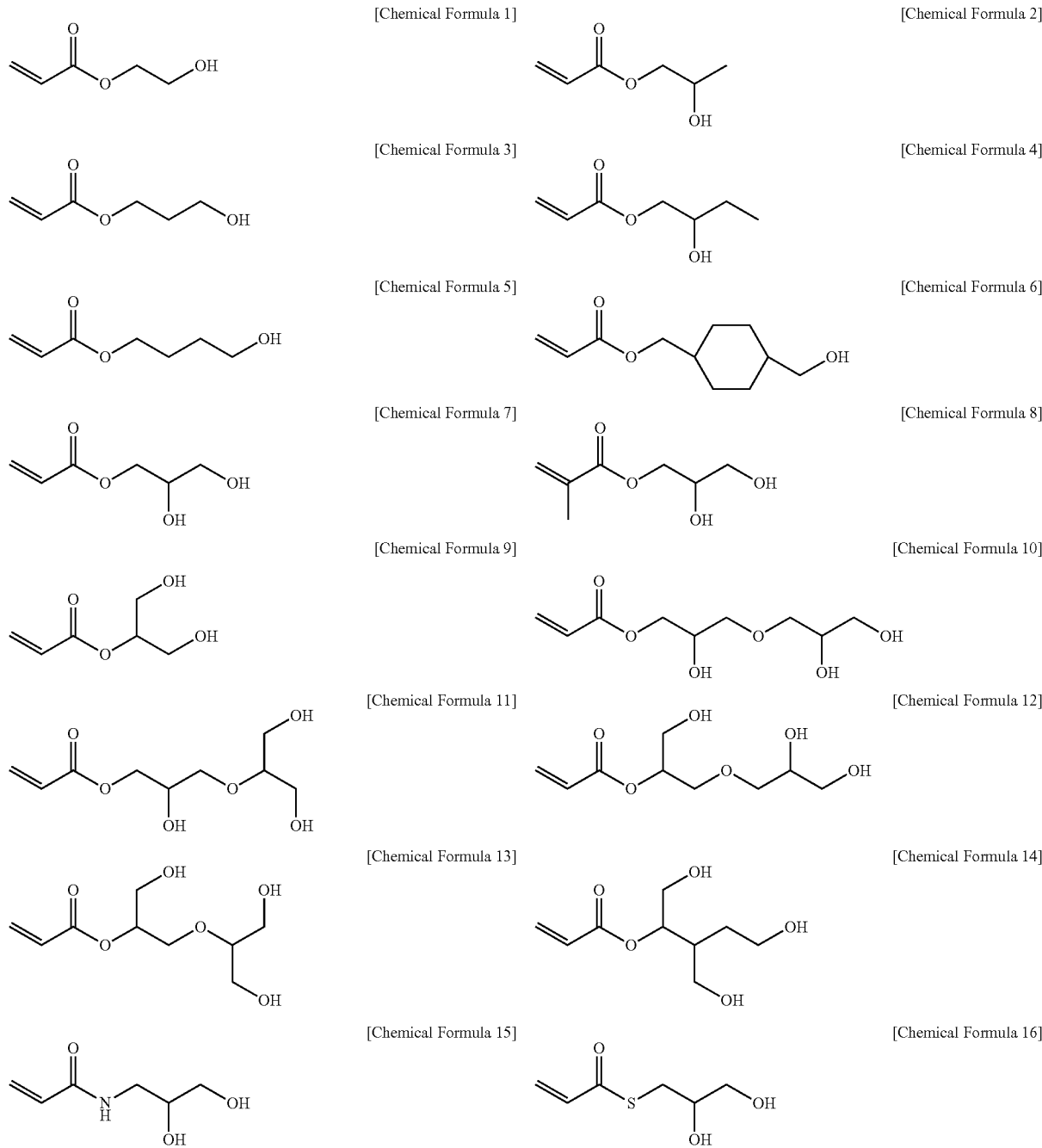

[Chemical Formula 17]
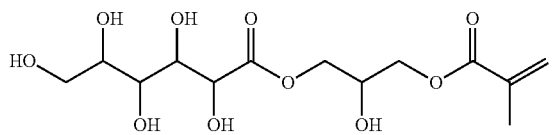
[Chemical Formula 18]
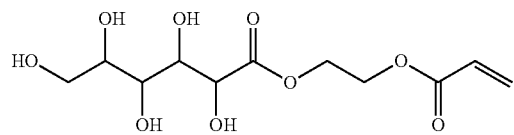
[Chemical Formula 19]
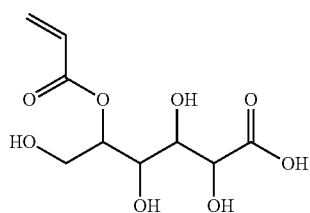
[Chemical Formula 20]
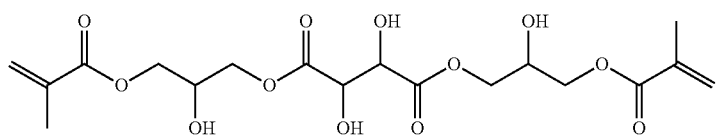
[Chemical Formula 21]
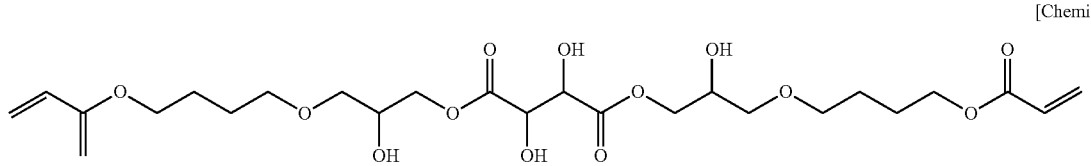
In addition, the (a-2) second compound may be one or more types selected from the group consisting of the following [Chemical Formula 22] to [Chemical Formula 24].
[Chemical Formula 22]
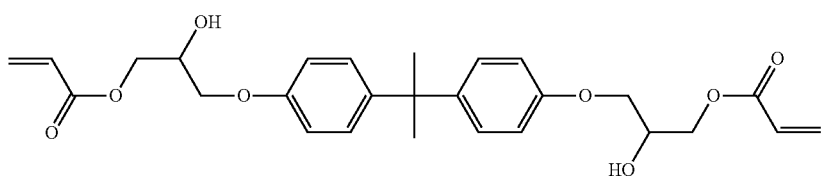
[Chemical Formula 23]
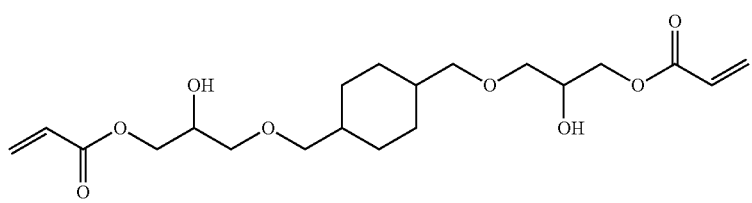
[Chemical Formula 24]
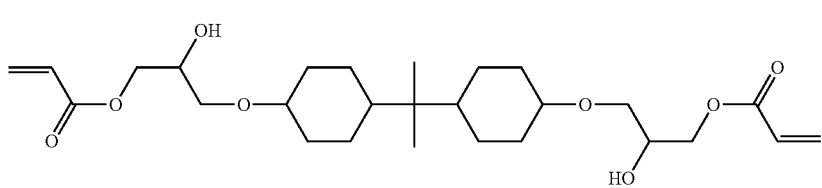

Meanwhile, the (B) phosphate-based compound is preferably a compound represented by the following [Chemical Formula I].

[Chemical Formula I]

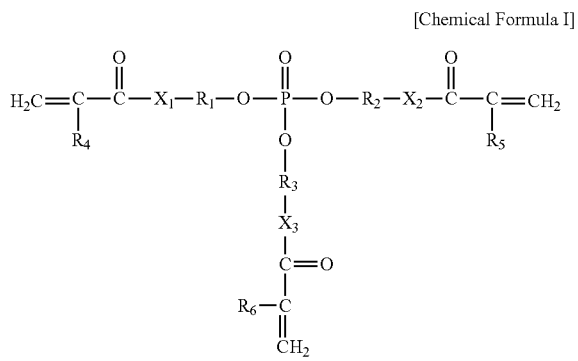

In [Chemical Formula I], $R_1$, $R_2$ and $R_3$ are each independently a substituted or unsubstituted $C_{1-10}$ alkylene group, a substituted or unsubstituted $C_{4-14}$ cycloalkylene group, a substituted or unsubstituted $C_{6-14}$ arylene group or a combination thereof; $R_4$, $R_5$ and $R_6$ are each independently hydrogen or a methyl group; and $X_1$, $X_2$ and $X_3$ are each independently oxygen (O) or nitrogen (N).

Meanwhile, the radical-curable adhesive composition may further include a (D) phosphate-based compound having one or two (meth)acrylic groups in the molecule.

Herein, the (D) phosphate-based compound is more preferably included in 5 to 40 parts by weight with respect to 100 parts by weight of the radical-curable adhesive composition.

In addition, the (D) phosphate-based compound more preferably includes one or more types selected from the group consisting of the following [Chemical Formula II] and/or [Chemical Formula III].

[Chemical Formula II]

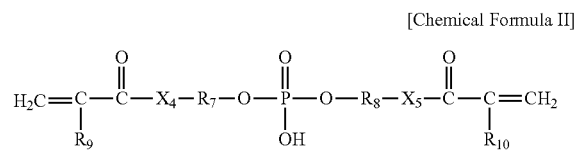

In [Chemical Formula II], $R_7$ and $R_8$ are each independently a substituted or unsubstituted $C_{1-10}$ alkylene group, a substituted or unsubstituted $C_{4-14}$ cycloalkylene group, a substituted or unsubstituted $C_{6-14}$ arylene group or a combination thereof; $R_9$ and $R_{10}$ are each independently hydrogen or a methyl group; and $X_4$ and $X_5$ are each independently oxygen (O) or nitrogen (N).

[Chemical Formula III]

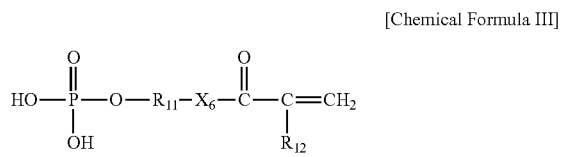

In [Chemical Formula III], $R_{11}$ is a substituted or unsubstituted $C_{1-10}$ alkylene group, a substituted or unsubstituted $C_{4-14}$ cycloalkylene group, a substituted or unsubstituted $C_{6-14}$ arylene group or a combination thereof; $R_{12}$ is hydrogen or a methyl group; $X_6$ is oxygen (O) or nitrogen (N).

Meanwhile, the radical-curable adhesive composition may further include a (E) multifunctional (meth)acryl-based compound.

Herein, the (E) multifunctional (meth)acryl-based compound is more preferably included in 5 to 40 parts by weight with respect to 100 parts by weight of the radical-curable adhesive composition.

In addition, the (E) multifunctional (meth)acryl-based compound is more preferably one or more types selected from the group consisting of compounds represented by the following [Chemical Formula IV] to [Chemical Formula VI].

[Chemical Formula IV]

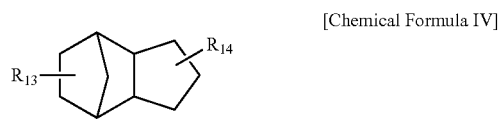

In [Chemical Formula IV], $R_{13}$ and $R_{14}$ are each independently a (meth)acryloyloxy group or a (meth)acryloyloxyalkyl group.

[Chemical Formula V]

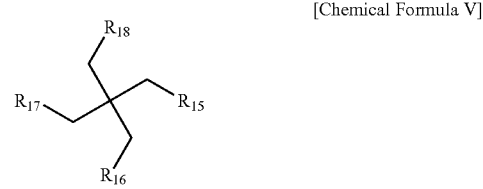

In [Chemical Formula V], $R_{15}$, $R_{16}$ and $R_{17}$ are each independently a (meth)acryloyloxy group or a (meth)acryloyloxyalkyl group, and $R_{18}$ is a (meth)acryloyloxy group, a (meth)acryloyloxyalkyl group, a hydroxyl group or a substituted or unsubstituted $C_{1-10}$ alkyl group.

[Chemical Formula VI]

In [Chemical Formula VI], $R_{19}$ is substituted or unsubstituted $C_{1-10}$ alkylene, and $R_{20}$ and $R_{21}$ are each independently a (meth)acryloyloxy group or a (meth)acryloyloxyalkyl group.

Meanwhile, a thickness of an adhesive layer formed by the radical-curable adhesive composition is preferably 10 μm or less.

In addition, the radical-curable adhesive composition preferably has a glass transition temperature of 50° C. or higher after curing.

Furthermore, the radical-curable adhesive composition preferably has viscosity of 70 cP or less.

In another aspect, the present invention provides a polarizing plate including a polarizer; an adhesive layer formed on at least one surface of the polarizer; and a polarizer protective film formed on the adhesive layer, wherein the adhesive layer is formed using the radical-curable adhesive composition.

In still another aspect, the present invention provides an optical member including a display panel; and a polarizer attached to an external-most surface of the display panel through a medium of an adhesive layer, wherein the adhesive layer is formed using the radical-curable adhesive composition.

Advantageous Effects

A radical-curable adhesive composition according to the present invention has excellent adhesive strength for films made of various materials, for example, TAC films, acryl-based films, COP films and PET films, has excellent water resistance such that discoloration of a polarizer does not occur even under high humidity conditions, and has a high glass transition temperature after curing leading to excellent heat resistance of a polarizing plate prepared therewith, and furthermore, has low viscosity leading to the formation of a thinner adhesive layer, and workability is also excellent.

Moreover, a radical-curable adhesive composition according to the present invention may also be used for attaching a polarizer and a display panel, and in this case, the composition may be formed to a thin film when compared to generally-used acryl-based adhesives and the like, and an adhesive layer may be formed between the polarizer and the display panel using an in-line process, therefore, excellent productivity may be obtained. In addition, the composition has excellent heat resistance reliability compared to generally-used acryl-based adhesives and the like.

MODE FOR DISCLOSURE

Hereinafter, preferred embodiments of the present invention will be described. However, embodiments of the present invention may be modified to various other forms, and the scope of the present invention is not limited to the embodiments described below. In addition, embodiments of the present invention are provided in order to more completely describe the present invention for those having average knowledge in the art.

1. Radical-Curable Adhesive Composition

As a result of extensive studies, the inventors of the present invention have found that when a phosphate-based compound having three (meth)acrylic groups in the molecule is mixed to an adhesive composition having a hydrophilic functional group, adhesive strength is excellent, and water resistance and heat resistance are excellent as well, and furthermore, low viscosity may be obtained, and completed the present invention.

More specifically, a radical-curable adhesive composition of the present invention includes a (A) radical-polymerizable compound having at least one hydrophilic functional group in the molecule; a (B) phosphate-based compound having three (meth)acrylic groups in the molecule; and a (C) radical initiator.

More preferably, the radical-curable adhesive composition of the present invention includes the (A) radical-polymerizable compound in 40 to 93 parts by weight, the (B) phosphate-based compound in 1 to 30 parts by weight, and the (C) radical initiator in 0.5 to 20 parts by weigh, with respect to 100 parts by weight of the radical-curable adhesive composition.

1-1. Radical-Polymerizable Compound Including Hydrophilic Group (A)

First, the (A) radical-polymerizable compound having at least one hydrophilic functional group in the molecule included in the radical-curable adhesive composition according to the present invention is a component for obtaining adhesive strength of an adhesive, and adhesive strength may be obtained through hydrogen bonding by the compound having at least one hydrophilic functional group in the molecule, and the use of the radical-polymerizable compound is not particularly limited as long as the compound is capable of radical polymerization by the presence of a carbon-carbon unsaturated double bond in the molecule. Herein, the hydrophilic functional group is not particularly limited as long as the group is capable of hydrogen bonding, such as a hydroxyl group, a carboxyl group, a urethane group, an amine group and an amide group, however, a hydroxyl group is more preferable among these for obtaining excellent adhesive strength.

Meanwhile, although not limited thereto, the (A) radical-polymerizable compound is particularly preferably a mixture of a (a-1) radical-polymerizable first compound including at least one hydroxyl group and at least one (meth) acrylic group in the molecule; and a (a-2) radical-polymerizable second compound including at least two hydroxyl groups, at least one benzene ring or cyclohexane ring, and at least two (meth)acrylic groups in the molecule for accomplishing the effects of the present invention.

Herein, the use of the (a-1) first compound is not particularly limited as long as the compound includes at least one hydroxyl group and includes at least one (meth)acrylic group in the molecule, however, compounds corresponding to the (a-2) second compound to be described later in the present specification are not included in the (a-1) first compound.

More specifically, examples of the (a-1) first compound may include, but are not limited to, one or more types selected from the group consisting of the following [Chemical Formula 1] to [Chemical Formula 21].

[Chemical Formula 1]

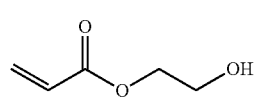

[Chemical Formula 2]

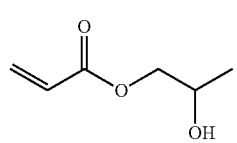

[Chemical Formula 3]

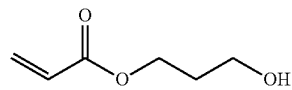

[Chemical Formula 4]

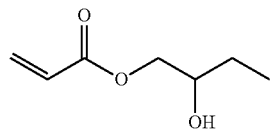

-continued
[Chemical Formula 5]
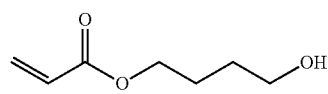
[Chemical Formula 6]
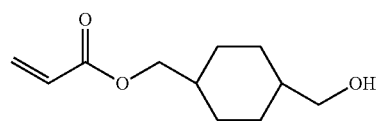
[Chemical Formula 7]
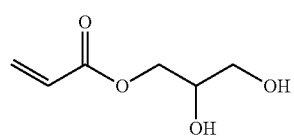
[Chemical Formula 8]
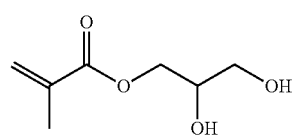
[Chemical Formula 9]
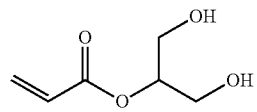
[Chemical Formula 10]
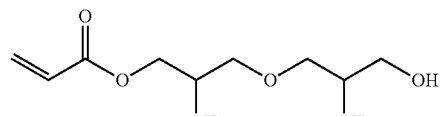
[Chemical Formula 11]
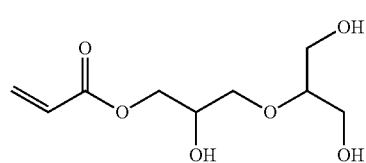
[Chemical Formula 12]
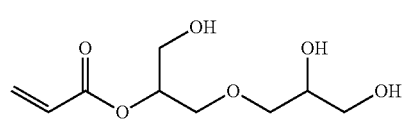
[Chemical Formula 13]
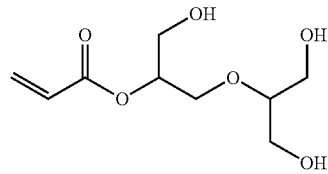
[Chemical Formula 14]
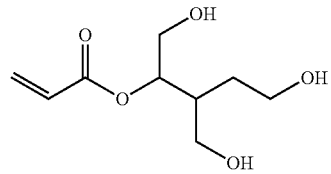
[Chemical Formula 15]
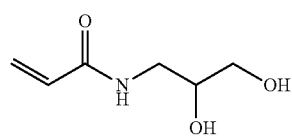
[Chemical Formula 16]
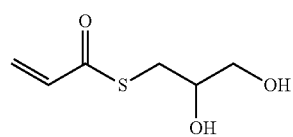
[Chemical Formula 17]
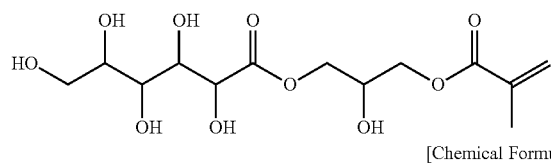
[Chemical Formula 18]
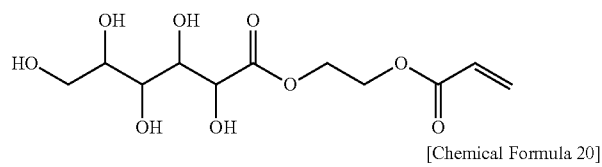
[Chemical Formula 19]
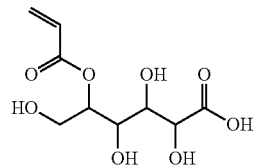
[Chemical Formula 20]
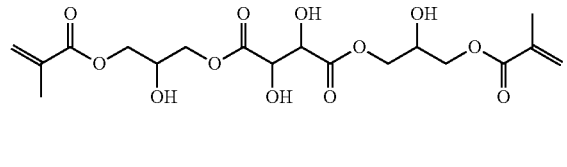
[Chemical Formula 21]
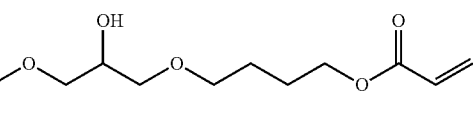

In addition, the use of the (a-2) second compound is not particularly limited as long as the compound includes at least two hydroxyl groups, includes at least one benzene ring or cyclohexane ring, and includes at least two (meth)acrylic groups in the molecule.

More specifically, examples of the (a-2) second compound may include, but are not limited to, one or more types selected from the group consisting of the following [Chemical Formula 22] to [Chemical Formula 24].

[Chemical Formula 22]

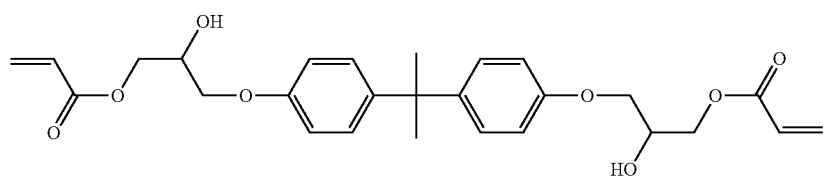

[Chemical Formula 23]

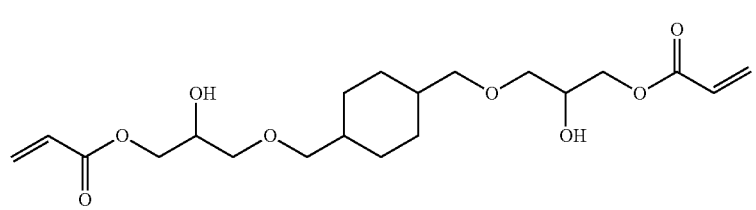

[Chemical Formula 24]

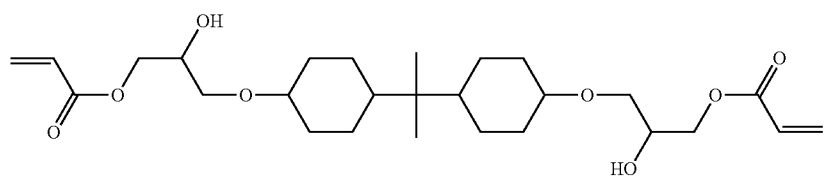

Meanwhile, the content of the radical-polymerizable compound of the present invention may be approximately 40 to 93 parts by weight, preferably approximately 40 to 90 parts by weight, and more preferably approximately 45 to 90 parts by weigh, with respect to 100 parts by weight of the whole adhesive composition. When the content satisfies the above range, excellent adhesive strength may be obtained.

1-2. Trifunctional Phosphate-Based Compound (B)

Next, the (B) phosphate-based compound having three (meth)acrylic groups in the molecule included in the radical-curable adhesive composition according to the present invention is a component for further enhancing adhesive strength of an adhesive, and furthermore, securing excellent water resistance and heat resistance, and various phosphate-based compounds including three (meth)acrylic groups in the molecule may be used.

According to the research results of the inventors of the present invention, among phosphate-based compounds, using a phosphate-based compound including three (meth) acrylic groups in the molecule may also secure excellent thermal shock stability and heat resistance compared to using a phosphate-based compound including one or two (meth)acrylic groups in the molecule, and furthermore, low viscosity is more readily obtained.

Meanwhile, although not limited thereto, the (B) phosphate-based compound is more preferably a compound represented by the following [Chemical Formula I]. In this case, the effects described above are particularly superior.

[Chemical Formula I]

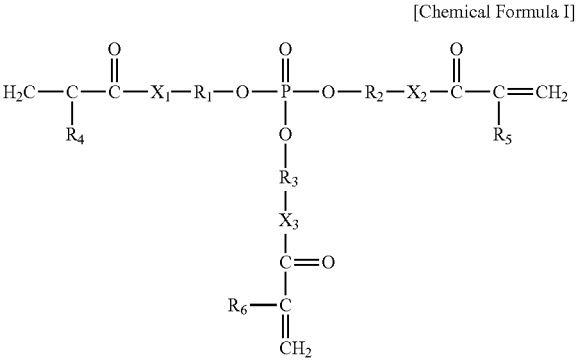

In [Chemical Formula I], $R_1$, $R_2$ and $R_3$ are each independently a substituted or unsubstituted $C_{1-10}$ alkylene group, a substituted or unsubstituted $C_{4-14}$ cycloalkylene group, a substituted or unsubstituted $C_{6-14}$ arylene group or a combination thereof; $R_4$, $R_5$ and $R_6$ are each independently hydrogen or a methyl group; and $X_1$, $X_2$ and $X_3$ are each independently oxygen (O) or nitrogen (N).

Herein, in $R_1$, $R_2$ and $R_3$, the alkylene group means a linear or branched divalent hydrocarbon part of 1 to 10, 1 to 8, or 1 to 4 carbon atoms, and the alkylene group in the present specification may include at least one unsaturated bond in the molecule. Meanwhile, examples of the alkylene group may include, but are not limited to, methylene, ethylene, trimethylene, tetramethylene, pentamethylene, hexamethylene, heptamethylene, nonamethylene, decamethylene and the like. One or more hydrogen atoms included in the alkylene group may be substituted with any substituent.

In addition, in $R_1$, $R_2$ and $R_3$, the cycloalkylene group means a nonaromatic divalent monocyclic, bicyclic or tricyclic hydrocarbon part of 4 to 14, 4 to 10, or 4 to 6 ring carbons, and the cycloalkylene group in the present specification may include at least one unsaturated bond in the molecule. Meanwhile, examples of the cycloalkylene group may include, but are not limited to, a divalent cyclopentane ring, a divalent cyclohexane ring and the like. One or more hydrogen atoms included in the cycloalkylene group may be substituted with any substituent.

Furthermore, in $R_1$, $R_2$ and $R_3$, the arylene group means a divalent monocyclic, bicyclic or tricyclic aromatic hydrocarbon part having 6 to 14, or 6 to 12 ring atoms, and examples thereof may include, but are not limited to, a divalent benzene ring, a divalent naphthalene ring, a divalent anthracene ring, a divalent biphenyl ring and the like. One or more hydrogen atoms included in the arylene group may be substituted with any substituent.

Meanwhile, among the groups shown above, $R_1$, $R_2$ and $R_3$ are, although not limited thereto, preferably a substituted or unsubstituted $C_{1-10}$ alkylene group, more preferably a substituted or unsubstituted $C_{1-8}$ alkylene group, and even more preferably a substituted or unsubstituted $C_{1-4}$ alkylene group.

More specifically, although not limited thereto, the (B) phosphate-based compound may include one or more types selected from the group consisting of the following [Chemical Formula 25] to [Chemical Formula 30].

[Chemical Formula 25]

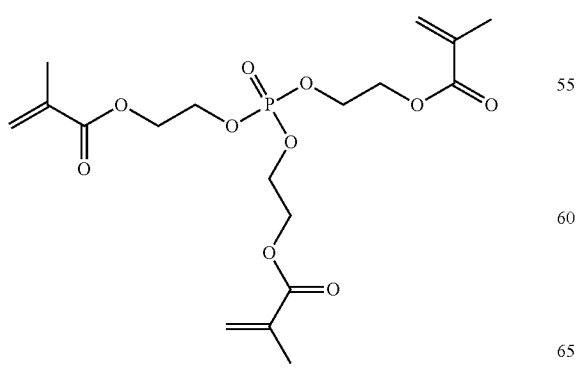

[Chemical Formula 26]

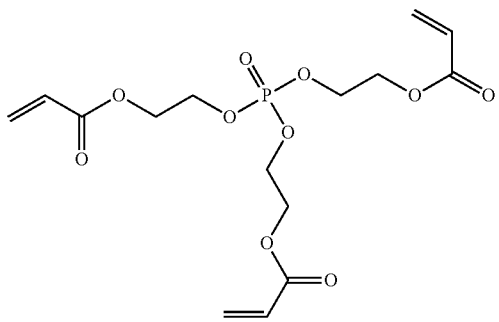

[Chemical Formula 27]

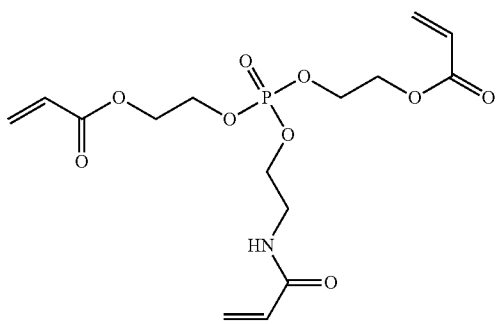

[Chemical Formula 28]

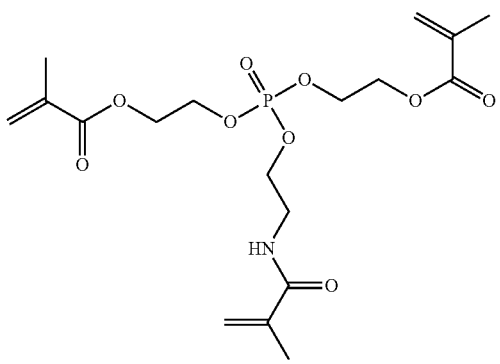

[Chemical Formula 29]

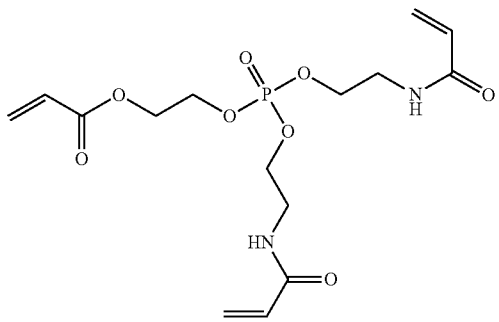

-continued

[Chemical Formula 30]

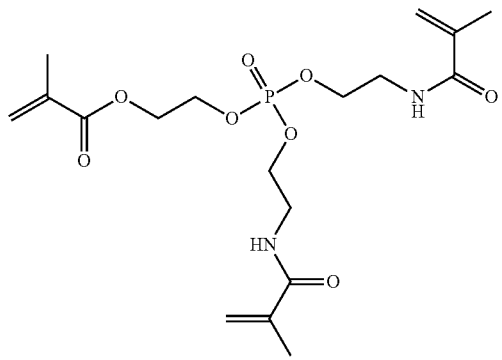

Meanwhile, the content of the (B) phosphate-based compound may be approximately 1 to 30 parts by weight, preferably approximately 5 to 30 parts by weight, and more preferably approximately 6 to 29 parts by weight, with respect to 100 parts by weight of the whole adhesive composition. When the content of the phosphate-based compound is less than the above range, thermal shock stability and water resistance are difficult to be secured, and viscosity is high. When the content of the phosphate-based compound is greater than the above range, adhesive strength is reduced.

1-3. Radical Initiator (C)

Next, the (C) radical initiator included in the radical-curable adhesive composition according to the present invention is for enhancing a curing rate by facilitating radical polymerization. Herein, radical initiators generally used in the art may be used without limit as the radical initiator, and examples thereof may include one or more types selected from the group consisting of 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, methyl benzoylformate, oxy-phenyl-acetic acid-2-[2-oxo-2-phenyl-acetoxy-ethoxy]-ethyl ester, oxy-phenyl-acetic acid-2-[2-hydroxy-ethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl (2,4,6-trimethylbenzoyl)-phosphine oxide, and phenylbis(2,4,6-trimethylbenzoyl)-phosphine oxide. In the present invention, phenylbis(2,4,6-trimethylbenzoyl)-phosphine oxide is particularly preferable.

Meanwhile, the content of the (C) radical initiator is preferably, for example, approximately 0.5 to 20 parts by weight, 0.5 to 15 parts by weight or 0.5 to 10 parts by weight, with respect to 100 parts by weight of the radical-curable adhesive composition. When the content of the radical initiator satisfies the above range, curing of an adhesive may be smoothly accomplished.

1-4. Additional Phosphate-Based Compound (D)

The radical-curable adhesive composition according to the present invention may further include a (D) phosphate-based compound having one or two (meth)acrylic groups in the molecule for obtaining more excellent adhesive strength and water resistance effects.

In other words, the radical-curable adhesive composition according to the present invention may include a (A) radical-polymerizable compound having at least one hydrophilic functional group in the molecule; a (B) phosphate-based compound having three (meth)acrylic groups in the molecule; a (C) radical initiator; and a (D) phosphate-based compound having one or two (meth)acrylic groups in the molecule.

Herein, the (D) phosphate-based compound is not particularly limited, and various phosphate-based compounds including one or two (meth)acrylic groups in the molecule may be used.

Meanwhile, although not limited thereto, the (D) phosphate-based compound more preferably includes one or more types selected from the group consisting of the following [Chemical Formula II] and/or [Chemical Formula III]. In this case, the effects described above are particularly superior.

[Chemical Formula II]

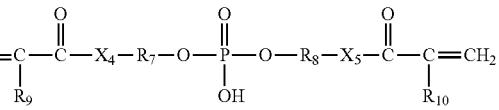

In [Chemical Formula II], $R_7$ and $R_8$ are each independently a substituted or unsubstituted $C_{1-10}$ alkylene group, a substituted or unsubstituted $C_{4-14}$ cycloalkylene group, a substituted or unsubstituted $C_{6-14}$ arylene group or a combination thereof; $R_9$ and $R_{10}$ are each independently hydrogen or a methyl group; and $X_4$ and $X_5$ are each independently oxygen (O) or nitrogen (N).

Herein, in $R_7$ and $R_8$, the alkylene group means a linear or branched divalent hydrocarbon part of 1 to 10, 1 to 8, or 1 to 4 carbon atoms, and the alkylene group in the present specification may include at least one unsaturated bond in the molecule. Meanwhile, examples of the alkylene group may include, but are not limited to, methylene, ethylene, trimethylene, tetramethylene, pentamethylene, hexamethylene, heptamethylene, nonamethylene, decamethylene and the like. One or more hydrogen atoms included in the alkylene group may be substituted with any substituent.

In addition, in $R_7$ and $R_8$, the cycloalkylene group means a nonaromatic divalent monocyclic, bicyclic or tricyclic hydrocarbon part of 4 to 14, 4 to 10, or 4 to 6 ring carbons, and the cycloalkylene group in the present specification may include at least one unsaturated bond in the molecule. Meanwhile, examples of the cycloalkylene group may include, but are not limited to, a divalent cyclopentane ring, a divalent cyclohexane ring and the like. One or more hydrogen atoms included in the cycloalkylene group may be substituted with any substituent.

Furthermore, in $R_7$ and $R_8$, the arylene group means a divalent monocyclic, bicyclic or tricyclic aromatic hydrocarbon part having 6 to 14, or 6 to 12 ring atoms, and examples thereof may include, but are not limited to, a divalent benzene ring, a divalent naphthalene ring, a divalent anthracene ring, a divalent biphenyl ring and the like. One or more hydrogen atoms included in the arylene group may be substituted with any substituent.

Meanwhile, among the groups shown above, $R_7$ and $R_8$ are, although not limited thereto, preferably a substituted or unsubstituted $C_{1-10}$ alkylene group, more preferably a substituted or unsubstituted $C_{1-8}$ alkylene group, and even more preferably a substituted or unsubstituted alkylene group.

[Chemical Formula III]

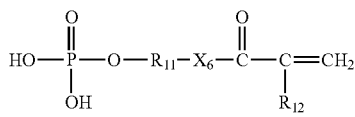

In [Chemical Formula III], $R_{11}$ is a substituted or unsubstituted $C_{1-10}$ alkylene group, a substituted or unsubstituted $C_{4-14}$ cycloalkylene group, a substituted or unsubstituted $C_{6-14}$ arylene group or a combination thereof; $R_{12}$ is hydrogen or a methyl group; and $X_6$ is oxygen (O) or nitrogen (N).

Herein, in $R_{11}$, the alkylene group means a linear or branched divalent hydrocarbon part of 1 to 10, 1 to 8, or 1 to 4 carbon atoms, and the alkylene group in the present specification may include at least one unsaturated bond in the molecule. Meanwhile, examples of the alkylene group may include, but are not limited to, methylene, ethylene, trimethylene, tetramethylene, pentamethylene, hexamethylene, heptamethylene, nonamethylene, decamethylene and the like. One or more hydrogen atoms included in the alkylene group may be substituted with any substituent.

In addition, in $R_{11}$, the cycloalkylene group means a nonaromatic divalent monocyclic, bicyclic or tricyclic hydrocarbon part of 4 to 14, 4 to 10, or 4 to 6 ring carbons, and the cycloalkylene group in the present specification may include at least one unsaturated bond in the molecule. Meanwhile, examples of the cycloalkylene group may include, but are not limited to, a divalent cyclopentane ring, a divalent cyclohexane ring and the like. One or more hydrogen atoms included in the cycloalkylene group may be substituted with any substituent.

Furthermore, in $R_{11}$, the arylene group means a divalent monocyclic, bicyclic or tricyclic aromatic hydrocarbon part having 6 to 14, or 6 to 12 ring atoms, and examples thereof may include, but are not limited to, a divalent benzene ring, a divalent naphthalene ring, a divalent anthracene ring, a divalent biphenyl ring and the like. One or more hydrogen atoms included in the arylene group may be substituted with any substituent.

Meanwhile, among the groups shown above, $R_{12}$ is, although not limited thereto, preferably a substituted or unsubstituted $C_{1-10}$ alkylene group, more preferably a substituted or unsubstituted $C_{1-8}$ alkylene group, and even more preferably a substituted or unsubstituted $C_{1-4}$ alkylene group.

More specifically, although not limited thereto, the (D) phosphate-based compound may include one or more types selected from the group consisting of the following [Chemical Formula 31] to [Chemical Formula 34].

[Chemical Formula 31]

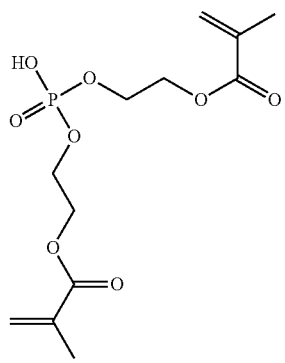

[Chemical Formula 32]

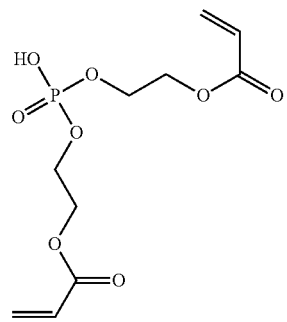

[Chemical Formula 33]

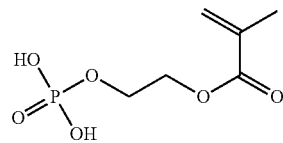

[Chemical Formula 34]

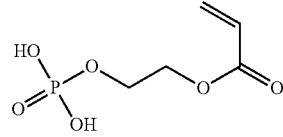

Meanwhile, the content of the (D) phosphate-based compound may be preferably approximately 5 to 40 parts by weight, more preferably approximately 5 to 35 parts by weight, and even more preferably approximately 5 to 30 parts by weight, with respect to 100 parts by weight of the radical-curable adhesive composition. When the content of the (D) phosphate-based compound is greater than the above range, adhesive strength may not be sufficient, and when the content is less than the above range, water resistance may become weak.

1-5. Multifunctional (Meth)Acryl-Based Compound (E)

The radical-curable adhesive composition according to the present invention may further include a (E) multifunctional (meth)acryl-based compound for obtaining more excellent adhesive strength and water resistance effects.

In other words, the radical-curable adhesive composition according to the present invention may include a (A) radical-polymerizable compound having at least one hydrophilic functional group in the molecule; a (B) phosphate-based compound having three (meth)acrylic groups in the molecule; a (C) radical initiator; and a (D) phosphate-based compound having one or two (meth)acrylic groups in the molecule and/or a (E) multifunctional (meth)acryl-based compound.

Herein, the (E) multifunctional (meth)acryl-based compound is not particularly limited, and various multifunctional (meth)acryl-based compounds widely known in the art having at least two (meth)acrylic groups in the molecule may be used without limit. However, in the present specification, except for multifunctional (meth)acryl-based compounds listed below as examples, compounds corresponding to the (A) to (D) compounds described above are not included in the multifunctional (meth)acryl-based compound.

In the present invention, examples of the (E) multifunctional (meth)acryl-based compound may include ethylene glycol di(meth)acrylate, 1,3-butanediol di(meth)acrylate, 1,4-butanediol di(meth)acrylate, 1,6-hexanediol di(meth)acrylate, 1,9-nonanediol di(meth)acrylate, neopentyl glycol di(meth)acrylate, trimethylolpropane di(meth)acrylate, pentaerythritol di(meth)acrylate, ditrimethylolpropane di(meth)acrylate, diethylene glycol di(meth)acrylate, triethylene glycol di(meth)acrylate, dipropylene glycol di(meth)acrylate, tripropylene glycol di(meth)acrylate, polyethylene glycol di(meth)acrylate, polypropylene glycol di(meth)acrylate, polytetramethylene glycol di(meth)acrylate, silicone di(meth)acrylate, hydroxyl puivalic acid ester neopentyl glycol di(meth)acrylate, 2,2-bis [4-(meth)acryloyloxyethoxyethoxyphenyl]propane, 2,2-bis [4-(meth)acryloyloxyethoxyethoxycyclohexyl]propane, hydrogen-added dicyclopentadienyl di(meth)acrylate, tricyclodecane dimethanol di(meth)acrylate, 1,3-dioxane-2,5-diyl di(meth)acrylate, di(meth)acrylate of 2-(2-hydroxy-1,1-dimethylethyl)-5-ethyl-5-hydroxymethyl-1,3-dioxane, tris(hydroxyethyl)isocyanurate di(meth)acrylate, glycerin tri(meth)acrylate, trimethylolpropane tri(meth)acrylate, ditrimethylolpropane tri(meth)acrylate, ditrimethylolpropane tetra(meth)acrylate, pentaerythritol tri(meth)acrylate, pentaerythritol tetra(meth)acrylate, dipentaerythritol tetra(meth)acrylate, dipentaerythritol penta(meth)acrylate, dipentaerythritol hexa(meth)acrylate, and the like. These may be used either alone or as a mixture thereof.

Meanwhile, although not limited thereto, the (E) multifunctional (meth)acryl-based compound more preferably include one or more types selected from the group consisting of compounds represented by the following [Chemical Formula IV] to [Chemical Formula VI]. In this case, water resistance improving effect is more superior.

[Chemical Formula IV]

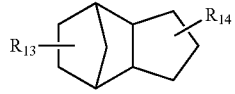

In [Chemical Formula IV], $R_{13}$ and $R_{14}$ are each independently a (meth)acryloyloxy group or a (meth)acryloyloxyalkyl group.

Herein, in $R_{13}$ and $R_{14}$, the alkyl of the (meth)acryloyloxyalkyl group means a linear or branched hydrocarbon part of 1 to 10, 1 to 8, or 1 to 4 carbon atoms, and the (meth)acryloyloxy group may substitute any position of the alkyl group. The rest one or more hydrogen atoms included in the alkyl may be substituted with any substituent.

[Chemical Formula V]

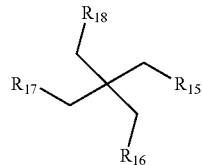

In [Chemical Formula V], $R_{15}$, $R_{16}$ and $R_{17}$ are each independently a (meth)acryloyloxy group or a (meth)acryloyloxyalkyl group, and $R_{18}$ is a (meth)acryloyloxy group, a (meth)acryloyloxyalkyl group, a hydroxyl group or a substituted or unsubstituted $C_{1-10}$ alkyl group.

Herein, in $R_{15}$, $R_{16}$, $R_{17}$ and $R_{18}$, the alkyl of the (meth)acryloyloxyalkyl group means a linear or branched hydrocarbon part of 1 to 10, 1 to 8, or 1 to 4 carbon atoms, and the (meth)acryloyloxy group may substitute any position of the alkyl group. The rest one or more hydrogen atoms included in the alkyl may be substituted with any substituent.

In addition, in $R_{18}$, the alkyl group means a linear or branched hydrocarbon part of 1 to 10, 1 to 8, or 1 to 4 carbon atoms, and one or more hydrogen atoms included in the alkyl group may be substituted with any substituent.

[Chemical Formula VI]

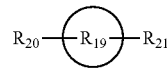

In [Chemical Formula VI], $R_{19}$ is substituted or unsubstituted $C_{1-10}$ alkylene, and $R_{20}$ and $R_{21}$ are each independently a (meth)acryloyloxy group or a (meth)acryloyloxyalkyl group.

Herein, in $R_{19}$, the alkylene means a linear or branched divalent hydrocarbon part of 1 to 10, 1 to 8, or 1 to 6 carbon atoms, and the alkylene group in the present specification may include at least one unsaturated bond in the molecule. Meanwhile, examples of the alkylene group may include, but are not limited to, methylene, ethylene, trimethylene, tetramethylene, pentamethylene, hexamethylene, heptamethylene, nonamethylene, decamethylene and the like. One or more hydrogen atoms included in the alkylene may be substituted with any substituent.

In addition, in $R_{20}$ and $R_{21}$, the alkyl of the (meth)acryloyloxyalkyl group means a linear or branched hydrocarbon part of 1 to 10, 1 to 8, or 1 to 4 carbon atoms, and the (meth)acryloyloxy group may substitute any position of the alkyl group. The rest one or more hydrogen atoms included in the alkyl may be substituted with any substituent.

More specifically, although not limited thereto, the (E) a multifunctional (meth)acryl-based compound particularly preferably includes one or more types selected from the group consisting of compounds represented by the following [Chemical Formula 35] to [Chemical Formula 38].

[Chemical Formula 35]

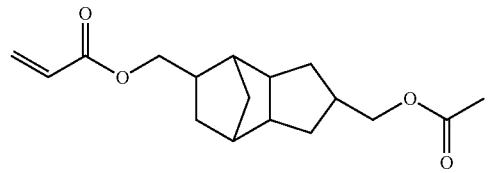

[Chemical Formula 36]

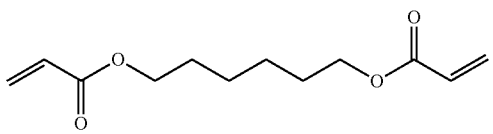

[Chemical Formula 37]

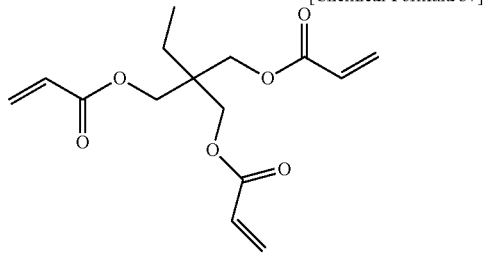

-continued

[Chemical Formula 38]

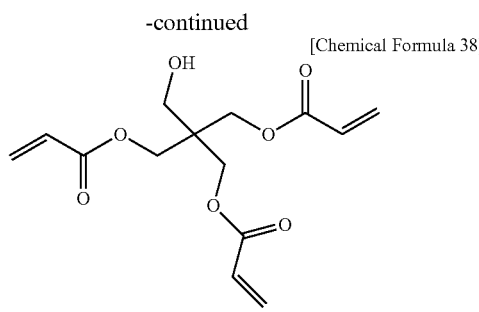

Meanwhile, the content of the (E) multifunctional (meth) acryl-based compound of the present invention may be approximately 5 to 40 parts by weight, preferably approximately 5 to 35 parts by weight, and more preferably approximately 5 to 30 parts by weight, with respect to 100 parts by weight of the whole adhesive composition. When the content of the (E) multifunctional (meth)acryl-based compound is greater than the above range, adhesive strength may not be sufficient, and when the content is less than the above range, water resistance may become weak.

1-6. Physical Properties of Composition

Meanwhile, the thickness of an adhesive layer formed by such a radical-curable adhesive composition of the present invention may be approximately greater than 0 and less than or equal to 10 μm, and preferably approximately 0.1 to 10 μm or 0.1 to 5 μm. When the thickness of the adhesive layer is less than 0.1 μm, uniformity and adhesive strength of the adhesive layer may be reduced, and when the thickness of the adhesive layer is greater than 10 there may be a problem in that forming to a thin film is difficult, and the exterior of a polarizing plate and the like including the adhesive layer gets wrinkled.

In addition, the radical-curable adhesive composition according to the present invention may have a glass transition temperature of 50° C. or higher after curing, for example, approximately 70 to 150° C. or 70 to 140° C. A polarizing plate prepared using the radical-curable adhesive composition according to the present invention having a glass transition temperature in the range described above has an advantage in that heat resistance and water resistance are excellent.

Furthermore, the radical-curable adhesive composition according to the present invention may have viscosity of 70 cP or less, for example, approximately 10 to 70 cP or 10 to 65 cP. When the viscosity of the adhesive composition satisfies the above range, there is an advantage in that the adhesive layer may be formed to be thin, and workability is excellent due to low viscosity of the adhesive layer.

Meanwhile, the radical-curable adhesive composition of the present invention described above may be very favorably used for a polarizing plate since the composition has excellent water resistance, heat resistance and viscosity properties, while having excellent adhesive strength for films made of various materials.

In addition, the radical-curable adhesive composition of the present invention described above may also exhibit excellent adhesive strength between a polarizer and a display panel, may form an adhesive layer as a thin film, has excellent heat resistance reliability, and furthermore, has excellent productivity in that the adhesive layer may be formed between the polarizer and the display panel using an in-line process, and therefore, the radical-curable adhesive composition of the present invention may also be favorably used when directly attaching a polarizer to a display panel.

Hereinafter, a polarizing plate and an optical member including the radical-curable adhesive composition of the present invention will be specifically described.

2. Polarizing Plate

First, a polarizing plate according to the present invention will be described.

A polarizing plate of the present invention includes a polarizer; an adhesive layer formed on at least one surface of the polarizer; and a protective film formed on the adhesive layer, wherein the adhesive layer is formed using the radical-curable adhesive composition of the present invention described above.

2-1. Polarizer

First, the polarizer is not particularly limited, and polarizers well known in the art, for example, films formed with polyvinyl alcohol (PVA) including iodine or dichroic dye may be used. The polarizer may be prepared by dyeing a PVA film with iodine or dichroic dye, however, the preparation method is not particularly limited. In the present specification, a polarizer means a state not including a protective film, and a polarizing plate means a state including a polarizer and a protective film.

2-2. Adhesive Layer

Next, the adhesive layer is formed using the radical-curable adhesive composition according to the present invention described above, and may be formed using methods well known in the art. For example, a method of forming an adhesive layer by applying an adhesive composition on one surface of a polarizer or a protective film, laminating the polarizer and the protective film, and then curing the result may be used. Herein, the application may be carried out using coating methods well known in the art, such as spin coating, bar coating, roll coating, gravure coating, and blade coating.

Meanwhile, the curing may be carried out by photocuring, more specifically, irradiating active energy rays such as ultraviolet rays, visible rays, an electron beam and X-rays. For example, the curing may be carried out using a method of irradiating ultraviolet rays of approximately 10 to 2500 mJ/cm$^2$ using an ultraviolet ray irradiator (metal halide lamp).

Alternatively, the curing may also be carried out by heat curing, more specifically, heat curing at a curing temperature of 80° C. or higher. Herein, in the heat curing, a known amine-based initiator may be additionally added to the composition as necessary for increasing the curing speed.

In addition, as the curing, the heat curing may be additionally carried out after the photocuring, or the photocuring may be additionally carried out after the heat curing.

2-3. Protective Film

Next, the protective film is used for supporting and protecting a polarizer, and protective films made of various materials generally known in the art, such as cellulose-based films, polyethylene terephthalate (PET) films, cycloolefin polymer (COP) films and acryl-based films, may be used without limit. Among these, using an acryl-based film is particularly preferable considering optical properties, durability, economic efficiency and the like.

Meanwhile, an acryl-based film capable of being used in the present invention may be obtained by extrusion molding materials to be molded including a (meth)acrylate-based resin as a main component. Herein, the (meth)acrylate-based resin is a material having a resin including a (meth)acrylate-based unit as a main component, and the concept also includes not only a homopolymer resin formed with a (meth)acrylate-based unit, but also a copolymer resin copolymerizing other monomer units in addition to a (meth)acrylate-based unit, and a blend resin blending other resins to such a (meth)acrylate-based resin.

Meanwhile, the (meth)acrylate-based unit may be, for example, an alkyl(meth)acrylate-based unit. Herein, the alkyl(meth)acrylate-based unit means both an alkylacrylate-based unit and an alkylmethacrylate-based unit, and the alkyl group of the alkyl(meth)acrylate-based unit preferably has a carbon number of 1 to 10, and more preferably has a carbon number of 1 to 4.

In addition, the monomer unit capable of being copolymerized with the (meth)acrylate-based unit may include a styrene-based unit, a maleic anhydride-based unit, a maleimide-based unit and the like. Herein, examples of the styrene-based unit may include, but are not limited to, styrene, α-methylstyrene and the like; examples of the maleic anhydride-based monomer may include, but are not limited to, maleic anhydride, methyl maleic anhydride, cyclohexyl maleic anhydride, phenyl maleic anhydride and the like; and examples of the maleimide-based monomer may include, but are not limited to, maleimide, N-methylmaleimide, N-cyclohexylmaleimide, N-phenylmaleimide and the like. These may be used either alone or as a mixture.

Meanwhile, the acryl-based film may be a film including a (meth)acrylate-based resin having a lactone ring structure. Specific examples of the (meth)acrylate-based resin having a lactone ring structure may include a (meth)acrylate-based resin having a lactone ring structure disclosed in Japanese Patent Application Laid-Open Publication No. 2000-230016, Japanese Patent Application Laid-Open Publication No. 2001-151814 and Japanese Patent Application Laid-Open Publication No. 2002-120326, and the like.

A method for preparing the acryl-based film is not particularly limited, and for example, the acryl-based film may be prepared by preparing a thermoplastic resin composition by sufficiently mixing a (meth)acrylate-based resin, other polymers, additives and the like using any proper mixing method, and then molding the result to a film, or the acryl-based film may be prepared by preparing a (meth)acrylate-based resin, other polymers, additives and the like as a separate solution, then forming a uniformly mixed solution by mixing the separately prepared solutions, and molding the result to a film. In addition, the acryl-based film may be any one of an unoriented film or an oriented film. When the acryl-based film is an oriented film, it may be either a monoaxially oriented film or a biaxially oriented film, and when the acryl-based film is a biaxially oriented film, it may be any one of a simultaneous biaxially oriented film or a sequential biaxially oriented film.

Meanwhile, the polarizing plate of the present invention may further include a primer layer in between the adhesive layer and the protective film for further improving adhesive strength. Herein, the primer layer may be formed using a method of applying a coating solution including a water dispersible polymer resin, water dispersible fine particles and water on the protective film using a bar coating method, a gravure coating method or the like, and drying the result. Examples of the water dispersible polymer resin may include a water dispersible polyurethane-based resin, a water dispersible acryl-based resin, a water dispersible polyester-based resin or a combination thereof, and as the water dispersible fine particles, inorganic-based fine particles such as silica, titania, alumina and zirconia, organic-based fine particles formed with a silicone-based resin, a fluorine-based resin, a (meth)acryl-based resin, a cross-linked polyvinyl alcohol and a melamine-based resin, or a combination thereof, may be used, but the examples are not limited thereto.

3. Optical Member

Next, an optical member according to the present invention will be described.

An optical member of the present invention includes a display panel; and a polarizer attached to an external-most surface of the display panel through a medium of an adhesive layer, wherein the adhesive layer is formed using the radical-curable adhesive composition of the present invention described above.

3-1. Display Panel

First, a display panel capable of being used in the present invention is not particularly limited, and for example, various modes of liquid crystal panels used in liquid crystal display devices may be used. Herein, specific constitutions of the liquid crystal panel are not particularly limited, and for example, the constitution may include upper transparent substrate/color filter/protective film/transparent conductive film electrode/oriented film/liquid crystal/oriented film/thin film transistor/lower transparent substrate, and the like.

The optical member of the present invention may have a polarizer attached to the external-most surface, that is, an upper transparent substrate or a lower transparent substrate, of a display panel through a medium of an adhesive layer, and herein, the adhesive layer is formed using the radical-curable adhesive composition of the present invention described above. Meanwhile, materials of the transparent substrate to which a polarizer is attached through a medium of an adhesive layer are not particularly limited, and known glass substrates or transparent polymer films may be used without limit.

3-2. Polarizer

Next, the polarizer is not particularly limited as described above, and polarizers well known in the art, for example, films formed with polyvinyl alcohol (PVA) including iodine or dichroic dye may be used. In addition, as described above, the polarizer may be prepared by dyeing a PVA film with iodine or dichroic dye, however, the preparation method is not particularly limited thereto.

Meanwhile, the polarizer may attach a separate protective film on the surface opposite to the surface attached to a display panel through a medium of an adhesive layer in order for supporting and protecting the polarizer. Herein, the details of the protective film are the same as those described above.

Meanwhile, attaching the polarizer and the protective film may be carried out using a method of applying an adhesive on the surface of the polarizer or the protective film using a roll coater, a gravure coater, a bar coater, a knife coater or a capillary coater and the like, and then laminating the result with heat using a laminating roll, or laminating by pressing the result at room temperature, or irradiating UV after laminating the result, or the like. Meanwhile, the adhesive is not limited to the radical-curable adhesive of the present invention described above, and various adhesives for a polarizing plate used in the art, such as a polyvinyl alcohol-based adhesive, a polyurethane-based adhesive, an acryl-based adhesive, and a cation-based or radical-based adhesive may be used without limit.

3-3. Adhesive Layer

Next, the adhesive layer is formed using the radical-curable adhesive composition of the present invention described above, and may be formed through an in-line process well known in the art. Specifically, the formation of the adhesive layer may be carried out using, for example, a method in which the radical-curable adhesive composition of the present invention is applied on the surface of a polarizer using a coating method well known in the art, while unwiding the polarizer or a polarizing plate in which a protective film is attached to one surface of the polarizer from a roll, then laminating the result on a display panel, and curing the coated adhesive composition layer. Herein, the curing may be carried out by photocuring as described above. The adhesive layer of the present invention may be formed through an in-line process as described above, and therefore, has an advantage in that productivity is excellent such that continuous production may be obtained.

Meanwhile, the adhesive layer may have a thickness of approximately 10 μm or less, and preferably approximately 0.1 to 10 μm or 0.1 to 5 μm. As for existing acryl-based adhesives commonly used for attaching a polarizer (or polarizing plate) to a display panel, at least a thickness of 20 μm is required in order to maintain proper adhesive strength, therefore, manufacturing thin display devices including this adhesive has had a limit, however, the adhesive layer of the present invention may be formed to be thin as described above, and therefore, there is an advantage in that display devices including this adhesive layer may be manufactured to be thinner.

Hereinafter, the present invention will be described in more detail with reference to specific examples.

Preparation Example 1—Preparation of Acryl-Based Protective Film

Raw material pellets were prepared by supplying a resin composition obtained by uniformly mixing poly(N-cyclohexylmaleimide-co-methylmethacrylate), a styrene-maleic anhydride copolymer resin and a phenoxy-based resin in a weight ratio of 100:2.5:5 to a 24 φ extruder substituted with nitrogen from a raw material hopper to an extruder, and melting the result at 250° C.

As the phenoxy-based resin, PKFE (Mw=60,000, Mn=16,000, Tg=95° C.) manufactured by InChem Corporation (trade name InChemRez) was used. As the styrene-maleic anhydride copolymer resin, Dylaeck 332 that is 85% by weight of styrene and 15% by weight of maleic anhydride was used, and as the poly(N-cyclohexylmaleimide-co-methylmethacrylate) resin, a compound having the N-cyclohexylmaleimide content in 6.5% by weight when analyzed using an NMR was used.

The obtained raw material pellets were vacuum dried, were melted at 260° C. using an extruder, then passed through a coat-hanger-type T-die, and then passed through a chrome plating casting roll and a drying roll, and as a result, a film having a thickness of 150 μm was prepared. An acrylic film was prepared by orienting this film to a percentage of 170% in an MD direction at 125° C. using the speed difference of the rolls with a pilot orientation apparatus.

The acrylic film prepared through the process described above was corona treated, and a primer composition, in which 20 parts by weight of an oxazoline cross-linking agent (manufactured by Nippon Shokubai Co. Ltd., WS700) was added to a primer composition having a solid content of 10% by weight prepared by diluting CK-PUD-F (urethane dispersion manufactured by Chokwang Paint Ltd.) with pure water, was coated on one surface of the acrylic film using a #7 bar, and the result was oriented to a percentage of 190% in a TD direction at 130° C. using a tenter, and finally, an acryl-based protective film having a primer layer thickness of 400 nm was prepared.

Preparation Example 2—Preparation of Adhesive Composition (1) Adhesive Composition A Adhesive Composition A for a polarizing plate was prepared by adding 3 parts by weight of irgacure-819 (manufactured by Ciba Specialty Chemicals Inc.), a radical initiator, to 100 parts by weight of a resin composition prepared by adding hydroxyethyl acrylate (HEA) in 66.7% by weight, BPA type epoxy di-acrylate (EB600, a product of Cytec Industries Inc.) in 16.6% by weight and tri-(acryloyloxyethyl)phosphate in 16.7% by weight.

(2) Adhesive Composition B

Adhesive Composition B for a polarizing plate was prepared by adding 3 parts by weight of irgacure-819 (manufactured by Ciba Specialty Chemicals Inc.), a radical initiator, to 100 parts by weight of a resin composition prepared by adding hydroxyethyl acrylate (HEA) in 50% by weight, BPA type epoxy di-acrylate (EB600, a product of Cytec Industries Inc.) in 21.4% by weight, tri-(acryloyloxyethyl)phosphate in 14.3% by weight and di-(methacryloyloxyethyl)phosphate in 14.3% by weight.

(3) Adhesive Composition C

Adhesive Composition C for a polarizing plate was prepared by adding 3 parts by weight of irgacure-819 (manufactured by Ciba Specialty Chemicals Inc.), a radical initiator, to 100 parts by weight of a resin composition prepared by adding hydroxyethyl acrylate (HEA) in 50% by weight, BPA type epoxy di-acrylate (EB600, a product of Cytec Industries Inc.) in 21.4% by weight, tri-(acryloyloxyethyl)phosphate in 21.4% by weight and di-(methacryloyloxyethyl)phosphate in 7.2% by weight.

(4) Adhesive Composition D

Adhesive Composition D for a polarizing plate was prepared by adding 3 parts by weight of irgacure-819 (manufactured by Ciba Specialty Chemicals Inc.), a radical initiator, to 100 parts by weight of a resin composition prepared by adding hydroxyethyl acrylate (HEA) in 50% by weight, BPA type epoxy di-acrylate (EB600, a product of Cytec Industries Inc.) in 21.4% by weight, tri-(acryloyloxyethyl)phosphate in 14.3% by weight and dimethylol tricyclodecane diacrylate (DCPDA) in 14.3% by weight.

(5) Adhesive Composition E

Adhesive Composition E for a polarizing plate was prepared by adding 3 parts by weight of irgacure-819 (manufactured by Ciba Specialty Chemicals Inc.), a radical initiator, to 100 parts by weight of a resin composition prepared by adding hydroxyethyl acrylate (HEA) in 16.7% by weight, glyceryl methacrylate (GLM) in 50% by weight, BPA type epoxy di-acrylate (EB600, a product of Cytec Industries Inc.) in 16.6% by weight and tri-(acryloyloxyethyl)phosphate in 16.7% by weight.

(6) Adhesive Composition F

Adhesive Composition F for a polarizing plate was prepared by adding 3 parts by weight of irgacure-819 (manufactured by Ciba Specialty Chemicals Inc.), a radical initiator, to 100 parts by weight of a resin composition prepared by adding hydroxyethyl acrylate (HEA) in 50% by weight, 1,4-cyclohexanedimethanol mono-acrylate in 16.7% by weight, BPA type epoxy di-acrylate (EB600, a product of Cytec Industries Inc.) in 16.6% by weight and tri-(acryloyloxyethyl)phosphate in 16.7% by weight.

(7) Adhesive Composition G

Adhesive Composition G for a polarizing plate was prepared by adding 3 parts by weight of irgacure-819 (manufactured by Ciba Specialty Chemicals Inc.), a radical initiator, to 100 parts by weight of a resin composition prepared by adding hydroxyethyl acrylate (HEA) in 50% by weight, BPA type epoxy di-acrylate (EB600, a product of Cytec Industries Inc.) in 21.4% by weight, 2-(acrylamido) ethyl bis(2-(acryloyloxyethyl)phosphate in 14.3% by weight and dimethylol tricyclodecane diacrylate (DCPDA) in 14.3% by weight.

(8) Adhesive Composition H

Adhesive Composition H for a polarizing plate was prepared by adding 3 parts by weight of irgacure-819 (manufactured by Ciba Specialty Chemicals Inc.), a radical initiator, to 100 parts by weight of a resin composition prepared by adding hydroxyethyl acrylate (HEA) in 30% by weight and BPA type epoxy di-acrylate (EB600, a product of Cytec Industries Inc.) in 70% by weight.

(9) Adhesive Composition I

Adhesive Composition I for a polarizing plate was prepared by adding 3 parts by weight of irgacure-819 (manufactured by Ciba Specialty Chemicals Inc.), a radical initiator, to 100 parts by weight of a resin composition prepared by adding hydroxyethyl acrylate (HEA) in 66.7% by weight, BPA type epoxy di-acrylate (EB600, a product of Cytec Industries Inc.) in 16.6% by weight and di-(methacryloyloxyethyl)phosphate in 16.7% by weight.

(10) Adhesive Composition J

Adhesive Composition J for a polarizing plate was prepared by adding 3 parts by weight of irgacure-819 (manufactured by Ciba Specialty Chemicals Inc.), a radical initiator, to 100 parts by weight of a resin composition prepared by adding hydroxyethyl acrylate (HEA) in 66.7% by weight, BPA type epoxy di-acrylate (EB600, a product of Cytec Industries Inc.) in 16.6% by weight and mono-(methacryloyloxyethyl)phosphate in 16.7% by weight.

Example 1

The Adhesive Composition A was applied on the primer layer of the acrylic film-based protective film prepared in Preparation Example 1 using a dropping pipette, and the result was laminated on both surfaces of a polarizer (PVA element), and then the result passed through a laminator (5 m/min) after setting the condition of the adhesive layer to have a final thickness of 1 to 2 μm. Next, ultraviolet rays of 1000 mJ/cm$^2$ irradiated on the surface laminated with the acrylic film using a UV irradiator (metal halide lamp), and as a result, a polarizing plate was prepared. Meanwhile, the polarizing plate was prepared under a condition of a temperature of 20° C. and humidity of 50%.

Example 2

A polarizing plate was prepared in the same manner as in Example 1 except that Adhesive Composition B was used.

Example 3

A polarizing plate was prepared in the same manner as in Example 1 except that Adhesive Composition C was used.

Example 4

A polarizing plate was prepared in the same manner as in Example 1 except that Adhesive Composition D was used.

Example 5

A polarizing plate was prepared in the same manner as in Example 1 except that Adhesive Composition E was used.

Example 6

A polarizing plate was prepared in the same manner as in Example 1 except that Adhesive Composition F was used.

Example 7

A polarizing plate was prepared in the same manner as in Example 1 except that Adhesive Composition G was used.

Comparative Example 1

A polarizing plate was prepared in the same manner as in Example 1 except that Adhesive Composition H was used.

Comparative Example 2

A polarizing plate was prepared in the same manner as in Example 1 except that Adhesive Composition I was used.

Comparative Example 3

A polarizing plate was prepared in the same manner as in Example 1 except that Adhesive Composition J was used.

Test Example 1—Evaluation on Peel Strength of Polarizing Plate

Peel strength of the polarizing plate prepared in the examples and the comparative examples was measured, and shown in the following [Table 1]. Specifically, the polarizing plate prepared in the examples and the comparative examples was left unattended for 4 days under a condition of a temperature of 20° C. and humidity of 70%, then cut into pieces having a width of 20 mm, and a length of 100 mm, and the peel strength of the polarizer and the protective film was measured at a speed of 300 m/min and 90 degrees using a texture analyzer apparatus (TA-XT Plus manufactured by Stable Micro Systems, Ltd.). Herein, the peel strength of 2.5 N/2 cm or greater was marked as ⊚, the peel strength of greater than or equal to 1.5 N/2 cm and less than 2.5 N/2 cm was marked as ○, the peel strength of greater than or equal to 1.0 N/2 cm and less than 1.5 N/2 cm was marked as X, and the peel strength of less than 1.0 N/2 cm was marked as XX.

Test Example 2—Evaluation on Water Resistance of Polarizing Plate

Water resistance of the polarizing plate prepared in the examples and the comparative examples was measured and shown in the following [Table 2]. Specifically, the polarizing plate of the examples and the comparative examples was laminated on a glass substrate, and then immersed in a thermostat at 60° C., and water resistance was determined after 8 hours by the discoloration at the end of the polarizing plate, and when there was no discoloration, it was marked as excellent, when there was some discoloration, it was marked as fair, and when there was a lot of discoloration, it was marked as poor.

Test Example 3—Thermal Shock Stability Measurement

Thermal shock stability of the polarizing plate prepared in the examples and the comparative examples was measured and shown in the following [Table 1]. Specifically, the polarizing plate of the examples and the comparative examples was laminated on a glass substrate, the result was left unattended for 30 minutes at −40° C., and then left unattended again for 30 minutes at 80° C. This cycle was repeated for 100 times. Then, the degree of deformation on the exterior of the polarizing plate was evaluated by visual identification. When there was no deformation on the exterior of the polarizing plate, it was marked as excellent, and when cut unit cracks of less than 1 mm occur, it was marked as fair, and when cracks of 1 mm or greater occur, it was marked as poor.

Test Example 4—Viscosity Measurement of Adhesive Composition

Viscosity of the adhesive composition used in the examples and comparative examples was measured at 25° C. using a Viscometer TV-22 (TOKI SANGYO), and the results are shown in the following [Table 1].

TABLE 1

| Category | Adhesive Composition | Peel Strength | Water Resistance | Thermal Shock Stability | Viscosity [cP] |
|---|---|---|---|---|---|
| Example 1 | A | ○ | Excellent | Excellent | 42 |
| Example 2 | B | ◎ | Excellent | Excellent | 65 |
| Example 3 | C | ○ | Excellent | Excellent | 55 |
| Example 4 | D | ◎ | Excellent | Excellent | 63 |
| Example 5 | E | ◎ | Excellent | Fair | 50 |
| Example 6 | F | ○ | Excellent | Fair | 47 |
| Example 7 | G | ◎ | Fair | Excellent | 68 |
| Comparative Example 1 | H | XX | Poor | Poor | 90 |
| Comparative Example 2 | I | ○ | Poor | Fair | 72 |
| Comparative Example 3 | J | ○ | Poor | Fair | 75 |

As shown in Table 1, in Examples 1 to 7 of the present invention, it was seen that adhesive strength was excellent, water resistance and thermal shock stability were excellent as well, and viscosity was low.

However, in Comparative Example 1 that does not include a trifunctional phosphate-based compound, it was seen that peel strength, water resistance, thermal shock stability and a viscosity property were all poor.

In addition, in Comparative Example 2 using a bifunctional phosphate-based compound instead of a trifunctional phosphate-based compound, it was seen that peel strength and thermal shock stability were fair, however, water resistance and a viscosity property were still poor.

Furthermore, in Comparative Example 3 using a monofunctional phosphate compound instead of a trifunctional phosphate-based compound, it was seen that peel strength and a thermal shock property were fair, however, water resistance and a viscosity property were still poor.

Example 8

The Adhesive Composition A was applied on a glass substrate, and a polarizer (PVA element) and an upper protective film were laminated thereon, and then the result passed through a laminator (5 m/min) after setting the condition of the adhesive layer to have a final thickness of 1 to 2 μm. Next, ultraviolet rays of 1000 mJ/cm$^2$ irradiated on the surface laminated with the polarizer and the protective film using a UV irradiator (metal halide lamp), and as a result, an optical member in which the polarizer is attached to the glass substrate was prepared. Meanwhile, the optical member was prepared under a condition of a temperature of 20° C. and humidity of 50%.

Test Example 4—Evaluation on Peel Strength of Optical Member

Peel strength of the polarizing plate prepared in Example 8 was measured, and shown in the following [Table 2]. Specifically, the optical member prepared in Example 8 was left unattended for 4 days under a condition of a temperature of 20° C. and humidity of 70%, then cut into pieces having a width of 20 mm, and a length of 100 mm, and the peel strength of the polarizer and the glass substrate was measured at a speed of 300 m/min and 90 degrees using a texture analyzer apparatus (TA-XT Plus manufactured by Stable Micro Systems, Ltd.). Herein, the peel strength of 2.0 N/2 cm or greater was marked as excellent, the peel strength of greater than or equal to 1.0 N/2 cm and less than 2.0 N/2 cm was marked as fair, and the peel strength of less than 1.0 N/2 cm was marked as poor. Meanwhile, a method for measuring the hydroxyl value additionally listed in the following Table 2 is the same as the method described above.

TABLE 2

| Category | Adhesive Composition | Peel Strength | Water Resistance | Thermal Shock Stability | Viscosity [cP] |
|---|---|---|---|---|---|
| Example 8 | A | Excellent | Excellent | Excellent | 42 |

As shown in Table 2, it was seen that the adhesive composition of the present invention also had excellent adhesive strength between the polarizer and the glass substrate.

Hereinbefore, examples of the present invention have been described in detail, however, claims of the present invention are not limited thereto, and it will be apparent to those skilled in the art that various modifications and changes may be made without departing from the spirit of the present invention described in the claims.

The invention claimed is:
1. A radical-curable adhesive composition comprising:
a (A) radical-polymerizable compound having at least one hydrophilic functional group in the molecule;
a (B) phosphate-based compound having three (meth) acrylic groups in the molecule; and
a (C) radical initiator,
wherein the (B) phosphate-based compound is a compound represented by Chemical Formula I:

[Chemical Formula I]

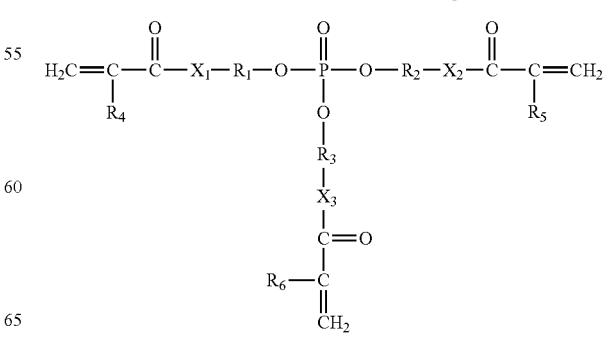

wherein $R_1$, $R_2$ and $R_3$ are each independently a substituted or unsubstituted $C_{1-10}$ alkylene group, a substituted or unsubstituted $C_{4-14}$ cycloalkylene group, a substituted or unsubstituted $C_{6-14}$ arylene group or a combination thereof; $R_4$, $R_5$ and $R_6$ are each independently hydrogen or a methyl group; and $X_1$, $X_2$ and $X_3$ are each independently oxygen (O) or nitrogen (N).

2. The radical-curable adhesive composition of claim 1, comprising:

the (A) radical-polymerizable compound in 40 to 93 parts by weight;

the (B) phosphate-based compound in 1 to 40 parts by weight; and the (C) radical initiator in 0.5 to 20 parts by weight, with respect to 100 parts by weight of the radical-curable adhesive composition.

3. The radical-curable adhesive composition of claim 1, wherein the (A) radical-polymerizable compound is a mixture of a (a-1) radical-polymerizable first compound including at least one hydroxyl group and at least one (meth)acrylic group in the molecule; and a (a-2) radical-polymerizable second compound including at least two hydroxyl groups, at least one benzene ring or cyclohexane ring, and at least two (meth)acrylic groups in the molecule.

4. The radical-curable adhesive composition of claim 3, wherein the (a-1) first compound is one or more types selected from the group consisting of the following [Chemical Formula 1] to [Chemical Formula 21]:

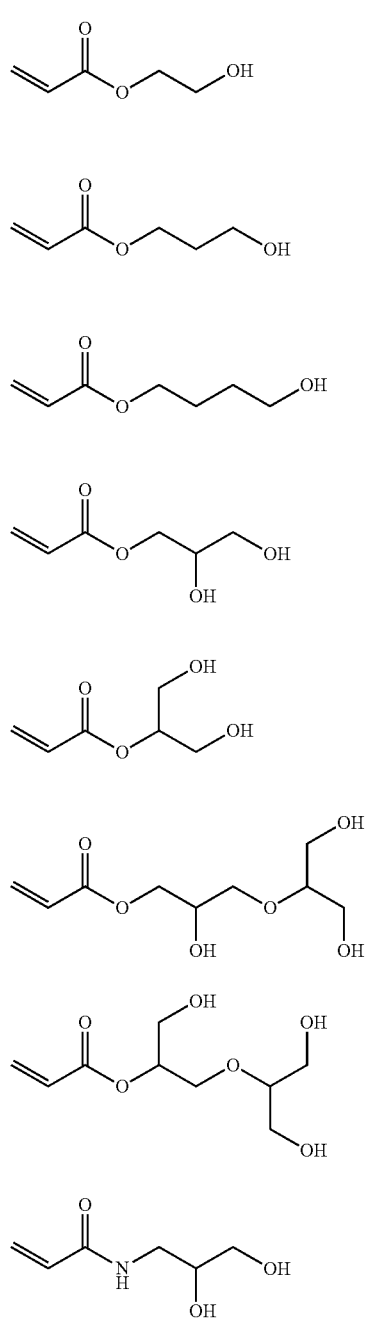

[Chemical Formula 17]
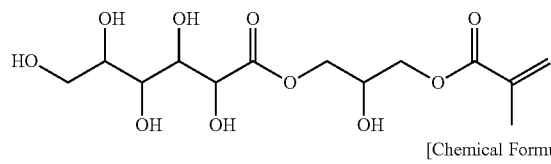
[Chemical Formula 18]
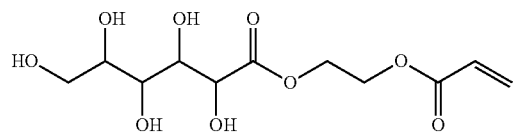
[Chemical Formula 19]
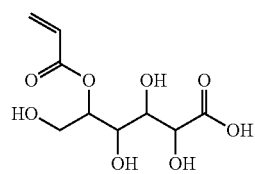
[Chemical Formula 20]
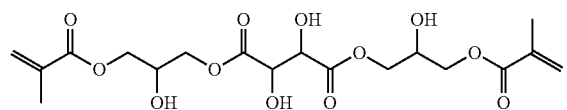
[Chemical Formula 21]
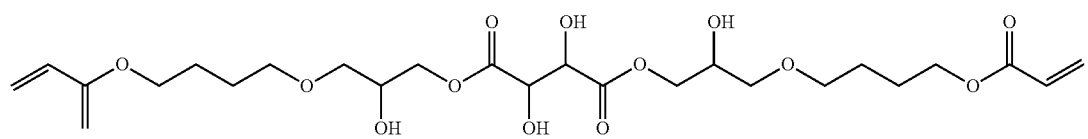
5. The radical-curable adhesive composition of claim 3, wherein the (a-2) second compound is one or more types selected from the group consisting of the following [Chemical Formula 22] to [Chemical Formula 24]:
[Chemical Formula 22]
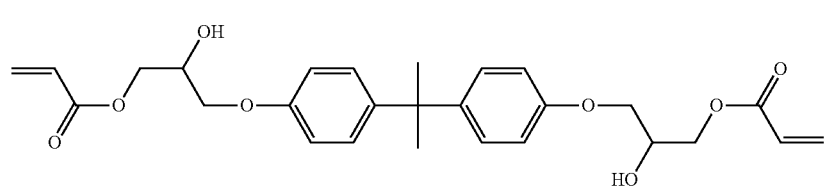
[Chemical Formula 23]
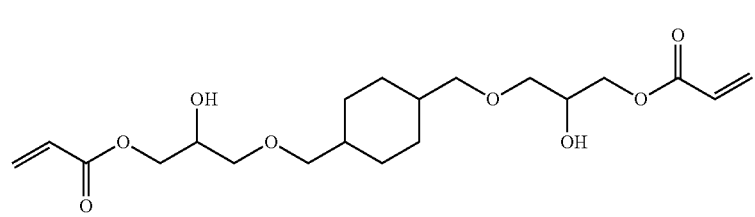
[Chemical Formula 24]
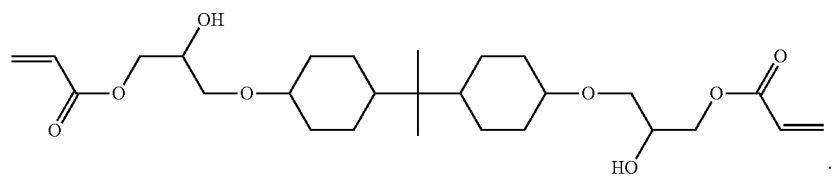

6. The radical-curable adhesive composition of claim 1, further comprising a (D) phosphate-based compound having one or two (meth)acrylic groups in the molecule.

7. The radical-curable adhesive composition of claim 6, wherein the (D) a phosphate-based compound is included in 5 to 40 parts by weight with respect to 100 parts by weight of the radical-curable adhesive composition.

8. The radical-curable adhesive composition of claim 6, wherein the (D) phosphate-based compound is one or more types selected from the group consisting of the following [Chemical Formula II] and [Chemical Formula III]:

[Chemical Formula II]

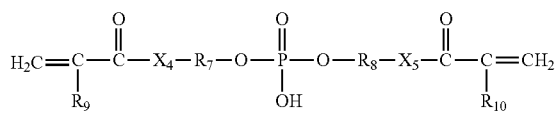

wherein, in [Chemical Formula II], $R_7$ and $R_8$ are each independently a substituted or unsubstituted $C_{1-10}$ alkylene group, a substituted or unsubstituted $C_{4-14}$ cycloalkylene group, a substituted or unsubstituted $C_{6-14}$ arylene group or a combination thereof; $R_9$ and $R_{10}$ are each independently hydrogen or a methyl group; and $X_4$ and $X_5$ are each independently oxygen (O) or nitrogen (N); and

[Chemical Formula III]

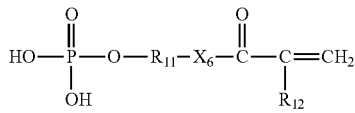

in [Chemical Formula III], $R_{11}$ is a substituted or unsubstituted $C_{1-10}$ alkylene group, a substituted or unsubstituted $C_{4-14}$ cycloalkylene group, a substituted or unsubstituted $C_{6-14}$ arylene group or a combination thereof; $R_{12}$ is hydrogen or a methyl group; $X_6$ is oxygen (O) or nitrogen (N).

9. The radical-curable adhesive composition of claim 1, further comprising a (E) multifunctional (meth)acryl-based compound.

10. The radical-curable adhesive composition of claim 9, wherein the (E) multifunctional (meth)acryl-based compound is included in 5 to 40 parts by weight with respect to 100 parts by weight of the radical-curable adhesive composition.

11. The radical-curable adhesive composition of claim 9, wherein the (E) multifunctional (meth)acryl-based compound is one or more types selected from the group consisting of compounds represented by the following [Chemical Formula IV] to [Chemical Formula VI]:

[Chemical Formula IV]

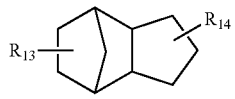

wherein, in [Chemical Formula IV], $R_{13}$ and $R_{14}$ are each independently a (meth)acryloyloxy group or a (meth)acryloyloxyalkyl group;

[Chemical Formula V]

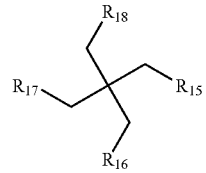

in [Chemical Formula V], $R_{15}$, $R_{16}$ and $R_{17}$ are each independently a (meth)acryloyloxy group or a (meth)acryloyloxyalkyl group, and $R_{18}$ is a (meth)acryloyloxy group, a (meth)acryloyloxyalkyl group, a hydroxyl group or a substituted or unsubstituted $C_{1-10}$ alkyl group; and

[Chemical Formula VI]

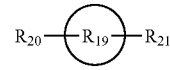

in [Chemical Formula VI], $R_{19}$ is substituted or unsubstituted $C_{1-10}$ alkylene, and $R_{20}$ and $R_{21}$ are each independently a (meth)acryloyloxy group or a (meth)acryloyloxyalkyl group.

12. The radical-curable adhesive composition of claim 1, wherein a thickness of an adhesive layer formed by the radical-curable adhesive composition is 10 μm or less.

13. The radical-curable adhesive composition of claim 1, which has a glass transition temperature of 50° C. or higher after curing.

14. The radical-curable adhesive composition of claim 1, which has viscosity of 70 cP or less.

15. A polarizing plate comprising:
a polarizer;
an adhesive layer formed on at least one surface of the polarizer; and
a polarizer protective film formed on the adhesive layer;
wherein the adhesive layer is formed using the radical-curable adhesive composition of claim 1.

16. An optical member comprising:
a display panel; and
a polarizer attached to an external-most surface of the display panel through a medium of an adhesive layer;
wherein the adhesive layer is formed using the radical-curable adhesive composition of claim 1.

* * * * *